(12) United States Patent
Doc et al.

(10) Patent No.: US 9,634,598 B2
(45) Date of Patent: Apr. 25, 2017

(54) MOTOR CURRENT MAPPING

(71) Applicant: RENAULT s.a.s., Boulogne Billancourt (FR)

(72) Inventors: Caroline Doc, Plaisir (FR); Thibaut Baumann, Jouy en Josas (FR)

(73) Assignee: RENAULT s.a.s., Boulogne Billantcourt (FR)

( * ) Notice: Subject to any disclaimer, the term of this patent is extended or adjusted under 35 U.S.C. 154(b) by 0 days.

(21) Appl. No.: 14/782,759

(22) PCT Filed: Apr. 17, 2014

(86) PCT No.: PCT/FR2014/050938
§ 371 (c)(1),
(2) Date: Oct. 6, 2015

(87) PCT Pub. No.: WO2014/174186
PCT Pub. Date: Oct. 30, 2014

(65) Prior Publication Data
US 2016/0043678 A1    Feb. 11, 2016

(30) Foreign Application Priority Data

Apr. 24, 2013 (FR) ..................... 13 53741

(51) Int. Cl.
*H02P 21/00* (2016.01)
*B60L 15/20* (2006.01)
(Continued)

(52) U.S. Cl.
CPC .......... *H02P 21/0035* (2013.01); *B60L 15/20* (2013.01); *H02K 11/0073* (2013.01);
(Continued)

(58) Field of Classification Search
CPC .................................................. H02P 21/0035
(Continued)

(56) References Cited

U.S. PATENT DOCUMENTS 6,329,781 B1    12/2001  Matsui et al.
6,480,767 B2 *  11/2002  Yamaguchi .............. B60K 6/46
                                                          180/165
(Continued)

FOREIGN PATENT DOCUMENTS

JP    2004-080896 A    3/2004

OTHER PUBLICATIONS

International Search Report issued on Jul. 8, 2014 for PCT/FR2014/050938 filed on Apr. 17, 2014.
(Continued)

*Primary Examiner* — David S Luo
(74) *Attorney, Agent, or Firm* — Oblon, McClelland, Maier & Neustadt, L.L.P.

(57) ABSTRACT

An electric machine combined with an electronic control unit including a set of onboard maps of a same setpoint parameter on the basis of first and second operating variables of the machine, each of the maps being associated with a different level of a third operating parameter of the electric machine. The maps include ranges of authorized values, and at least one range of extrapolated values. The electronic control unit is configured, for values of the third parameter not associated with one of the onboard maps, to use interpolated values between two authorized values, or between one authorized value and one extrapolated value.

10 Claims, 4 Drawing Sheets

(51) Int. Cl.
H02P 27/00 (2006.01)
H02K 11/00 (2016.01)
H02P 21/22 (2016.01)

(52) U.S. Cl.
CPC .......... H02P 21/0003 (2013.01); H02P 21/22 (2016.02); H02P 27/00 (2013.01); *B60L 2220/14* (2013.01); *B60L 2240/421* (2013.01); *B60L 2240/423* (2013.01); *B60L 2240/547* (2013.01); *B60L 2260/44* (2013.01); *Y02T 10/643* (2013.01); *Y02T 10/644* (2013.01); *Y02T 10/645* (2013.01); *Y02T 10/72* (2013.01); *Y02T 10/7275* (2013.01)

(58) Field of Classification Search
USPC .............................. 318/400.02, 400.01, 700
See application file for complete search history.

(56) References Cited

U.S. PATENT DOCUMENTS 6,989,644 B2 * 1/2006 Kim .......................... B60L 1/02
180/65.1
2010/0253252 A1 10/2010 Schulz et al.

OTHER PUBLICATIONS

French Search Report issued on Apr. 9, 2014 for FR 1353741 filed on Apr. 24, 2013.

* cited by examiner

MOTOR CURRENT MAPPING

The invention is related to electric motor vehicles. It may be applied, for example, to all-electric powered or hybrid vehicles, and in particular to vehicles driven by a wound rotor synchronous electric motor. Such electric motors, also termed electric machines, are supplied with an electric current at the voltage available from the vehicle's battery, with current intensity values which are periodic signals of which the amplitude and phase shifts are calculated from three setpoints $I_f$, $I_d$ and $I_q$ each consistent with a current intensity. These three setpoint values are mapped according to three parameters, which are usually the desired torque in the electric motor, the rotation speed of the electric motor and the voltage at the terminals of the battery supplying the motor.

In order to limit the memory space needed for recording the maps of each of the setpoint currents, two-dimensional maps are used, each of the two-dimensional maps being associated with a constant voltage value.

At a battery voltage level, a map may be associated connecting one of the three setpoints $I_f$, $I_d$ or $I_q$, according to the torque and the rotation speed of the motor. The vehicle has a plurality of 'embedded' maps of this setpoint value, e.g. $I_f$, each map corresponding to a different level of battery voltage. The voltage levels corresponding to the embedded maps are sometimes designated by the term 'break point', for distinguishing these voltage levels from voltage values which may otherwise form the subject of maps which are not, themselves, embedded on the vehicle, in order to save memory space.

When the battery voltage corresponds to one of the 'break point' voltages, an electronic control unit searches in one of the embedded maps for the corresponding current setpoint.

As the battery voltage decreases, some high motor rotation speed and high motor torque domains are no longer accessible in practice. These zones may be considered to be forbidden zones of the embedded maps.

For a given operating point (torque, speed) and a voltage not corresponding to a breakpoint voltage, the electronic control unit calculates the setpoint current by interpolating from two mapped current values for the same operating point, at two breakpoint voltage levels on each side of the sought voltage. However, when the operating point (torque, speed) is in a forbidden zone of one of the two maps used, typically in a forbidden zone of the lowest voltage level map, then interpolation cannot be performed. Nevertheless, the operating point (torque, speed) may be physically accessible with a setpoint suited to the sought voltage. This method of mapping management thus leads to unduly limiting the spatial zones (torque, speed, voltage) that are permitted for the motor's operation. This then leads to unduly limiting the motor torque that the driver may require when the voltage at the battery terminals decreases. Higher torque values would be accessible if a denser map network was used along the voltage axis.

The invention aims to provide an electric motor management system that is sparing in memory space, while enabling the best use of the available maximum torques, for each battery voltage, at the level of the motor.

For this purpose, the invention provides an electric machine associated with an electronic control unit including a group of embedded maps with the same setpoint parameter according to a first operating variable and a second operating variable of the machine, each of the maps being recorded in the same variation domain of the two variables, each of the maps being associated with a different level of a third operating parameter of the electric machine, the maps including ranges of values having at least two different types of status, or permitted value ranges, and at least one range of extrapolated values for at least one of the maps. The electronic control unit is configured, when the value of a third parameter is associated with one of the embedded maps, for using as a setpoint value values belonging to the permitted ranges excluding values belonging to the extrapolated ranges. The electronic control unit is configured, for values of the third parameter not associated with one of the embedded maps, for using interpolated values between two permitted values, or between a permitted value and an extrapolated value.

The maps may optionally also comprise forbidden ranges of the operating points domain, for which the value of the setpoint parameter is never used, either directly or by interpolation. In these forbidden ranges, the value assigned to the setpoint parameter may be random or undefined. For a third intermediate parameter value between two available maps, interpolation is performed with respect to the third parameter. Interpolation is performed between two values originating from the two maps and associated with the same operating point. Interpolation is always performed following the same interpolation formula, at least between two given levels of the third parameter.

The maps used for interpolation are those of which the third parameter values are closest to the value of the third parameter sought.

According to another aspect, the invention provides a method of controlling an electric machine. Control is performed with the aid of a group of maps for determining the same setpoint parameter as a function of a first variable and a second variable defining an operating point of the electric machine. Each of the maps is recorded in the same variation domain of the two variables, and is associated with a different level of a third operating parameter of the machine. The use is forbidden of a specific subgroup of values mapped as setpoint values, but this specific subgroup is used, however, for calculating setpoint values interpolated between a point of the specific subgroup and a second value of a neighboring map not belonging to one of the specific subgroups.

According to a preferred embodiment, the embedded maps are defined by selecting a limited number of reference maps from among a broader set of available maps, of which some portions are completed or modified, so that by subsequently performing interpolations between a modified portion of a first embedded map and an unmodified portion of a second embedded map, at least one portion of one of the non-embedded available maps is retrieved. The modified portions correspond to the specific subgroups of mapped values.

According to an advantageous embodiment, the reference maps are completed so that the result of the interpolation corresponds to a portion of the non-embedded map which is the closest, according to the third parameter, to the completed map used for the interpolation. The closest map is, of course, understood to mean the closest map in which the sought operating point is defined, excluding the other intermediate maps in which the operating point would not be defined, or would form part of a zone forbidden to be used.

In other words, at least one reference map is completed for obtaining a more complete embedded map, by extrapolating for each point to be completed, from the values of another reference map and another non-embedded map which are respectively the closest reference map and non-embedded map, according to the third parameter (V), of the map to be completed, so that, however, the operating point (N, C) to be completed is included in a permitted value range of the non-embedded map. The operating point (N, C) to be completed must, of course, also be within a permitted value range of the reference map.

According to a preferred embodiment, the same is carried out for all the maps which can thus be completed.

A map is a priori closer than another, according to the third parameter, to the map to be completed, if the outlines of the respective forbidden zones are closer. In practice, for each operating point (N, C) to be completed, one point of a non-embedded map of which the forbidden zone is closest to the corresponding torque (N, C) is selected for extrapolation, without, however, including the operating point.

Advantageously, in a domain of operating points which are not mapped in any of the available maps included between the embedded map to be completed and the closest embedded map, one or more virtual setpoint values equal to one or more setpoint values of the same map, corresponding to boundary points of the domain, are assigned to the operating points of the domain. The boundary points used may themselves be extrapolated points. The closest embedded map is understood as being the closest to the side of the map to be modified for subsequently performing interpolations between the two maps, i.e. that of the immediately neighboring maps with a smaller domain of forbidden operating points.

For example, at least one zone of one of the embedded maps may be completed by drawing a series of level lines of constant values from the boundary points of the zone.

Preferably, the level lines are parallel to an axis corresponding to the first variable or to an axis corresponding to the second variable.

According to one particularly interesting implementation, the first and second variables are proportional to the rotation speed and torque of the electric machine, and the third parameter is proportional to a battery voltage. The mapped setpoint parameter is used for calculating a current intensity setpoint of the stator or rotor of the electric machine.

In this embodiment, when using the specific subgroup of mapped values for an interpolation, the interpolation is performed between a higher voltage value of an unmodified portion of map, and a lower voltage value of a modified portion of map.

According to an advantageous embodiment, the use of a value belonging to the specific subgroup of mapped values for an interpolation is permitted only if the voltage for which it is desired to determine a setpoint value is greater than or equal to a threshold voltage. Threshold voltages may be mapped according to the operating points of the electric machine and according to the voltage of one of the maps used for interpolation.

In particular the method may be used for calculating a rotor current intensity (or direct current or excitation current) setpoint, a stator current intensity (or quadrature current) setpoint and/or a stator current intensity setpoint (along a 'direct' axis) in a synchronous electric machine, e.g. with a wound rotor.

Other objects, features and advantages of the invention will appear on reading the following description given solely by way of non-restrictive example and referring to the attached drawings, in which.

Figure 1:
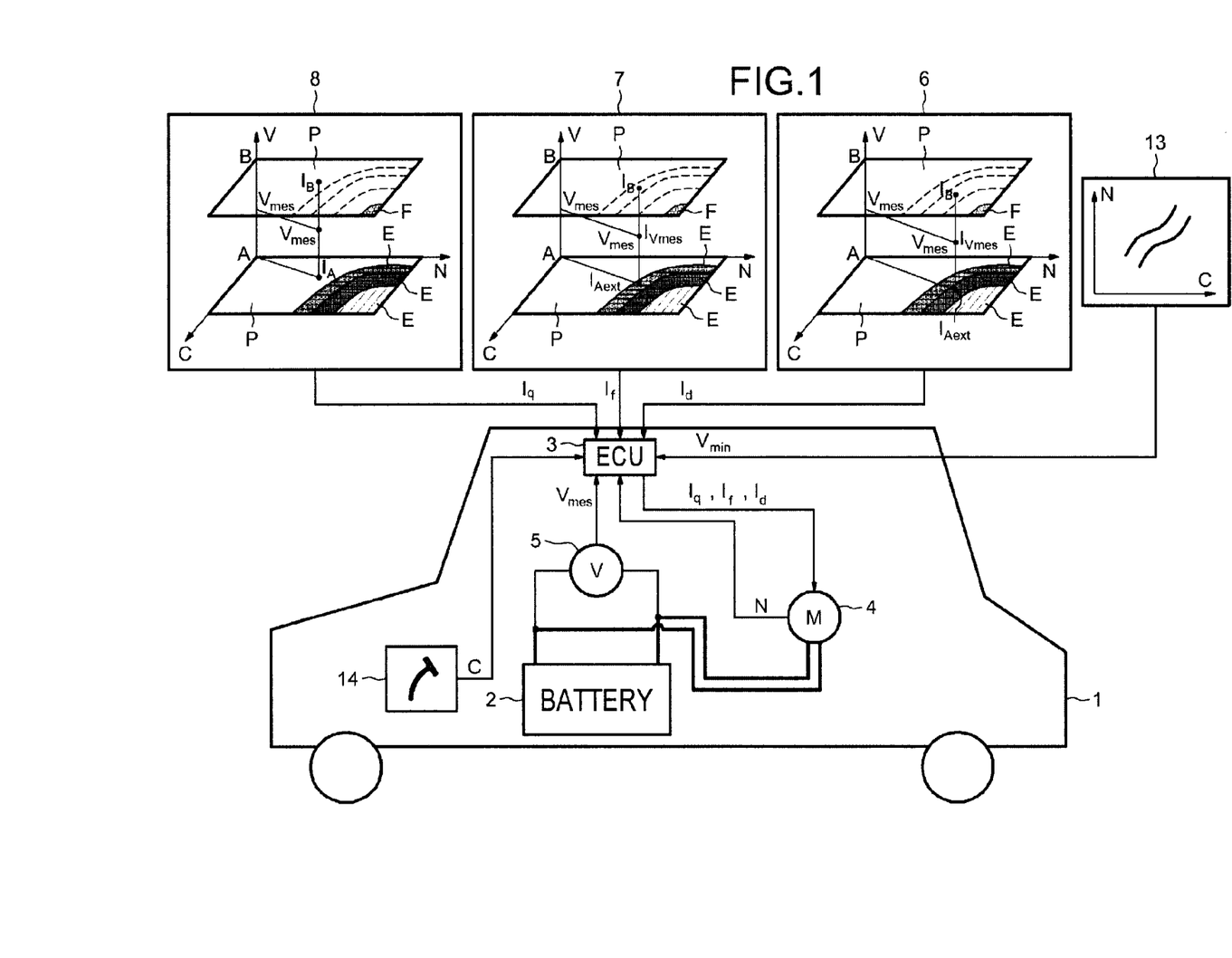
FIG. 1 represents a vehicle provided with an electric motor management system according to the invention, FIG. 2 schematically represents a method for constructing the maps used in the vehicle in FIG. 1.

As illustrated in FIG. 1, a vehicle 1, e.g. an electric powered vehicle or a hybrid powered vehicle, includes an electric motor 4 supplied by a battery 2. The current at the battery terminals is measured by a voltmeter 5 which sends the measured value $V_{mes}$ to an electronic control unit 3. The electronic control unit also receives other input data, including the speed—or rotation speed—N of the electric motor, and a setpoint torque C which may, for example, be sent from a gas pedal 14.

The electronic control unit 3 sends 'pwm' voltages to the motor 4 (one for each phase, constructed from the setpoint currents $I_d$, $I_q$, and one for excitation, constructed from the setpoint current $I_f$). The reference frame changes for recalculating a variable current setpoint for the stator phases from the setpoints $I_d$ and $I_q$ are known.

For preparing the current intensity setpoints $I_f$, $I_d$, $I_q$, the electronic control unit 3 uses three sets 6, 7 and 8 of embedded maps. Each of the sets comprises a series of two-dimensional maps, for reading a setpoint current value, for a given level A, B etc., of voltage V of the battery 2, in a plane representing the operating point values in the form of a torque (N, C)—C being the setpoint torque of the motor 4, and N being the rotation speed of the motor 4. When the voltage $V_{mes}$ of the battery does not belong to one of the mapped levels, the electronic control unit 3 performs, when possible, an interpolation between two neighboring voltage levels A, B located on each side of the measured voltage $V_{mes}$, e.g. according to the following equation 1:

$$I_{Vmes}(N, C) = I_A(N, C) + \frac{V_{mes} - A}{B - A}(I_B(N, C) - I_A(N, C)) \quad \text{Equation (1)}$$

The interpolation of equation 1 does not pose any problem when the operating point (N, C) is a permitted point in each of the adjacent maps, as illustrated, for example, in the set of maps 8.

However, the different maps of sets 6, 7, 8 comprise zones the use of which is subject to conditions dependent on the status of the zone. The maps may, for example, comprise permitted zones 'P', corresponding, in the coordinate plane (N, C), to low torque values and low rotation speed values of the motor 4. The maps further comprise 'extrapolated' zones identified by the letter 'E': these zones are not physically accessible for the breakpoint voltage associated with the map; current intensity values are still recorded in the map for the operating points of zone 'E'. These values mapped in zone 'E' can be used to perform an interpolation with another mapped value—for the same operating point—in permitted zone 'P' of a higher voltage map. Such an interpolation is, however, permitted only if the measured voltage $V_{mes}$ is sufficiently close to the higher voltage B map, or in other words, sufficiently far removed from the lower voltage A map. A map 13 may be defined identifying a minimum voltage $V_{min}$, according to the operating point (N, C), and according to the different breakpoints. The electronic control unit 3 performs the interpolation only if the battery's effective voltage $V_{mes}$ is greater than the minimum voltage $V_{min}$ mapped for the breakpoint A and the operating point (N, C) considered. Equation 1 is then applied using as value $I_A$ a value $I_{Aext}$ belonging to an extrapolated zone 'E', and a value $I_B$ originating from a permitted area 'P' of the other map on which the interpolation is based, as illustrated, for example, for map sets 6 and 7.

Typically, the voltage $V_{min}$ referenced in map 13 increases when the torque and/or the rotation speed of the operating point to be read increase. Some maps of map sets 6, 7, 8 may comprise forbidden zones identified by the letter 'F'. The operating points (N, C) in these forbidden zones are not permitted in reading a setpoint value (assuming that a value is defined in the map for this operating point) nor are they permitted for reading a value used in an interpolation calculation. The current intensity values of the forbidden zones 'F' of the maps may not be defined.

Figure 2:
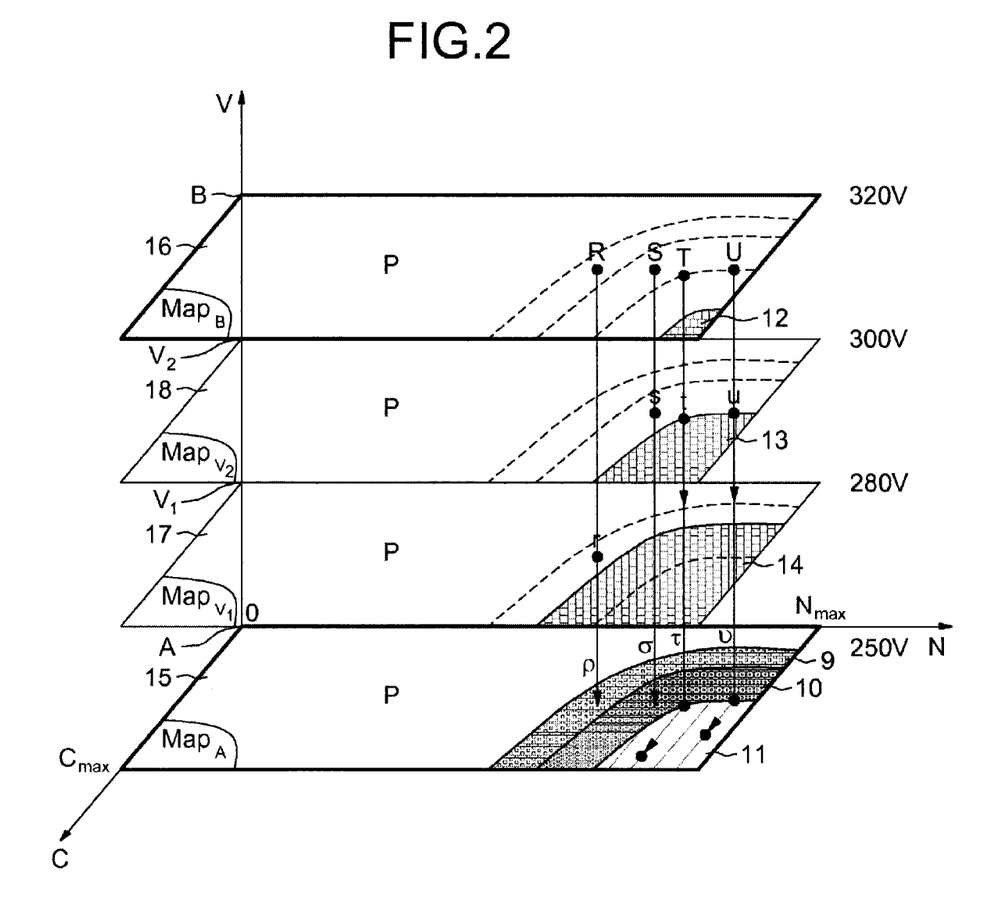

FIG. 2 graphically illustrates how the embedded maps on the vehicle in FIG. 1 are constructed, for one of the current intensity setpoints $I_f$, $I_d$, or $I_q$. Some elements found in FIG. 2 are common to FIG. 1, the same elements being designated by the same references.

FIG. 2 schematically represents two maps 15 and 16 corresponding to maps intended to be embedded on the vehicle, and two maps 17 and 18 which are not and will not be embedded on the vehicle.

Each of the maps covers the same domain of the motor's operating points, which is here represented between zero and a torque $C_{max}$, and between zero and a rotation speed $N_{max}$. In practice, the domain of the motor's operating points may typically be spread between two extreme torque values e.g. between a torque $-C_{max}$ and a torque $+C_{max}$ and an amplitude of rotation speed of the motor between 0 and a rotation speed $N_{max}$.

The two embedded maps 15 (also designated by $Map_A$) and 16 (also designated by $Map_B$) correspond respectively to levels A and B of battery voltage. The non-embedded maps 17 (also designated by $Map_{V1}$) and 18 (also designated by $Map_{V2}$) correspond respectively to levels $V_1$ and $V_2$ of battery voltage. Maps 15 and 16 may, for example, both belong to the first set of maps 6, both belong to the second set of maps 7, or both belong to the third set of maps 8 in FIG. 1.

The permitted zones P of maps 15, 16, 17, 18 have been prepared according to a common method. For example, these maps $Map_A$, $Map_B$, $Map_{V1}$, $Map_{V2}$ may be derived from the same calculation algorithm with the aid of a physical model representing the operation of the motor 4 and the battery 2. Maps 16, 17, 18 here comprise forbidden zones 12, 13, 14, which cannot be used for directly reading a current intensity setpoint value. Map 15 comprises extrapolated zones 9, 10, 11, which are located in a domain of operating points (N, C) also forbidden from direct reading of a current intensity setpoint. The current intensity values recorded in these extrapolated zones are calculated by extrapolation from values available in the neighboring maps 16, 17, 18, of which at least one value is taken from the embedded map 16. The values thus extrapolated will not be used as setpoint values for the battery voltage A, but will be used for calculating interpolated current intensity setpoint values, for voltage values between voltage A and voltage B. Thus a map 15 initially comprising a reading forbidden zone is replaced by an embedded map, of which the same zones offer values usable for calculations by interpolation at voltages higher than the voltage A associated with map 15.

The operating point range 9 is thus not physically accessible to voltage A, but is mapped as a permitted zone both in the embedded map 16 and in the non-embedded intermediate maps 17 and 18. The operating point range 10 is accessible to voltage $V_2$ and to voltage B, but is not accessible to voltage $V_1$. The operating point range 11 is not accessible to voltage $V_1$ nor to voltage $V_2$. Some of the points corresponding to range 11 may be accessible to voltage B, others not.

The mapped values corresponding to operating points belonging to ranges 9 or 10 are calculated by linear extrapolation from a point mapped in a permitted zone P of map 16 and a point mapped in a permitted zone P of one of the other intermediate non-embedded maps 17 or 18. Generally speaking, the extrapolated zones are constructed from at least some of the 'incomplete' maps (i.e. initially comprising forbidden zones), from permitted zones of an embedded map, and permitted zones of (non-embedded) intermediate maps. The permitted zones of (non-embedded) intermediate maps must, of course, be more extensive than those of the map to be completed. In the particular application where the maps represent a setpoint current intensity according to the torque of the motor and the rotation speed of the motor for different battery voltage levels, the extrapolated zones of the lower voltage maps are completed from permitted zones of higher battery voltage maps.

If an operating point (N, C) of one of the ranges 9 or 10 is mapped in a permitted zone 'P' in the embedded map $Map_B$ and in an intermediate map e.g. $Map_{Vk}$, a notional value of the current intensity setpoint $I_{Aext}$ may be calculated according to the following linear extrapolation formula:

$$I_{Aext}(N, C) = f[I_{V_k}(N, C), I_B(N, C)] \quad \text{Equation (2)}$$
$$= I_{V_k}(N, C) - \frac{I_B(N, C) - I_{V_k}(N, C)}{B - V_k}(V_k - A)$$

Where:

A, B, $V_k$ are the voltages respectively associated with maps $Map_A$, $Map_B$, $Map_{Vk}$, $I_B$ and $I_{Vk}$ are the current intensity setpoints read respectively in maps $Map_B$ and $Map_{Vk}$ for the same operating point.

Other types of extrapolation may optionally be used, provided that the interpolation formulas used when reading maps allow the values initially read in maps 17 and 18 to be retrieved.

Over the voltage interval A, B, during interpolations concerning points of one of the ranges 9, 10 or 11, greater accuracy of the interpolated values is wanted for the low battery voltage values compared with the case where the invention is not applied.

In other words, if an operating point is 'available' in the closest (non-embedded) intermediate map, here $Map_{V1}$, the extrapolation is performed between a point of the embedded map $Map_B$ and a point of the closest map $Map_{V1}$. Otherwise, a search is made among the available intermediate maps, for the closest map in which the operating point considered is mapped. Thus, in the example illustrated in FIG. 2, a point p concerning a first operating point of range 9 is extrapolated from a point r of the intermediate map $Map_{V1}$ and a point R of the embedded map $Map_B$. A point σ corresponding to an operating point of range 10 is extrapolated from a point s belonging to the intermediate map $Map_{V2}$, this operating point not being available in the map $Map_{V1}$, and a point S in the map $Map_B$. Two points τ and υ belonging to the boundary between ranges 10 and 11 are mapped from a point T of map $Map_B$ and a point t at the permitted domain limit of map $Map_{V2}$ respectively from a point U belonging to the map $Map_B$ and a point u belonging to the map $Map_{V2}$.

The points thus extrapolated τ and υ belong to the boundary between ranges 10 and 11. For points inside range 11, there are insufficient points on the intermediate maps 17 or 18 that can be used to perform an extrapolation.

In order to be able just the same to perform interpolations between range 11 and map $Map_B$, the operating points of range 11 are arbitrarily assigned current intensity values identical to those of an operating point having at least one common coordinate N or C with the point to be extrapolated, and located on the boundary of ranges 10 and 11.

The same current intensity setpoint value may, for example, be assigned in range 11 to all points having the same coordinate N of motor rotation speed. It should be remembered, of course, that these points are not used directly as setpoint values but only for performing these interpolations at certain voltages permitted by map 13 in FIG. 1.

Just as map 15 was 'completed', notional current intensity setpoint values may be assigned to points of map 16 that are found, following the initial modeling calculation, in a forbidden zone 12 of the map. The forbidden zones 13 of map $Map_{V2}$ and 14 of map $Map_{V1}$ do not have to be completed since these maps are not present on the vehicle.

Subsequently, the 'completed' maps 15 and 16, as well as other maps, completed or not, corresponding to voltages higher than B, are embedded on the vehicle 1. When the electronic control unit 3 has to deliver a current intensity setpoint value at an intermediate voltage to the A and B voltages, it performs an interpolation if the corresponding operating point belongs to the permitted ranges of both map $Map_B$ and map $Map_A$. When the operating point being calculated belongs to a permitted range of map $Map_B$ and belongs to an extrapolated range 9, 10 or 11 of map $Map_A$, the electronic control unit 3 first checks, using map 13, whether an interpolation is permitted for the voltage value considered. If the interpolation is permitted, then the electronic control unit 3 performs an interpolation between the value in the permitted zone of map $Map_B$ and the value in the extrapolated zone of map $Map_A$.

Figure 3:
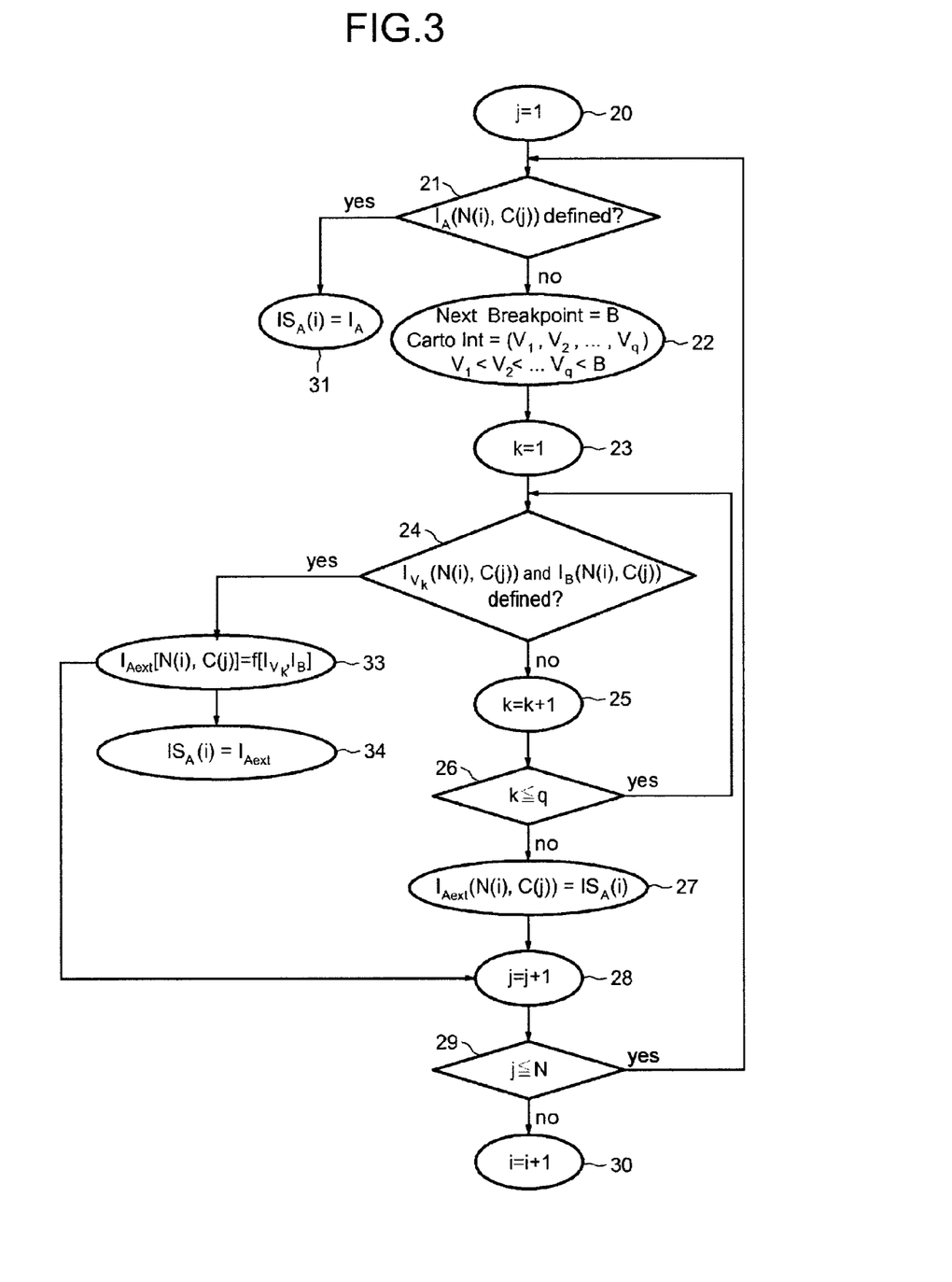
FIG. 3 is a simplified algorithm for calculating some of the map points in FIG. 2.

FIG. 3 schematically illustrates an example of an algorithm for constructing values associated with ranges 9, 10, 11 of the embedded map 15—or $Map_A$. The same reasoning can be used for higher voltage maps. Generally speaking, maps are 'completed' from the lowest voltage embedded map, and forbidden ranges of the higher voltage embedded maps are optionally 'completed' thereafter.

In FIG. 3, it is assumed that the setpoint torques C of the motor are discretized according to an index j, and the rotation speeds N of the motor are discretized according to an index i.

FIG. 3 illustrates only one portion of the algorithm, namely the scanning 'in j' of the domain of the operating points (N(i), C(j)) of the motor, for a constant value N(i). Scanning is performed by incrementing the index j so as to move from one region of the plane (N, C) corresponding to a permitted zone of the map—typically torques with an absolute value close to zero—towards one end of the plane which may comprise initially forbidden zones of the map— typically strongly positive or strongly negative torques.

An initial step 20 begins on one of the axes of the map corresponding to a calculation index j=1. In a subsequent step 21, a test is performed to determine whether a current intensity value $I_A$ corresponding to the torque of the current operating point (N(i),C(j)) is defined in map 15 associated with the voltage value A of the battery.

If this value $I_A$ is defined, i.e. if it is in a permitted domain of map 15, then, in step 31, a default current intensity value $IS_A(i)$ is recorded as being equal to the current value $I_A$.

If it is in one of ranges 9, 10 or 11 initially not permitted on map 15, the test 21 returns to a step 22 where it identifies:
voltage B of the embedded map 16 which is the closest to the voltage higher than A; voltage B is considered the 'breakpoint' according to A;
the values of voltages $V_1, V_2, \ldots V_q$ for which there are maps between voltages A and B. The maps taken into account belong to a family of maps obtained by the same method as maps 15 and 16, but are not intended to be embedded on the vehicle.

The voltages $V_1, V_2 \ldots$ up to $V_q$ are classified in ascending order. These voltages are, of course, all less than voltage B.

A counter k is initialized to 1 in a step 23, then a test 24 is performed to determine whether, in the map closest to map 15, a setpoint current $I_{Vk}$ is defined for the operating point (N(i), C(j)); it is also checked whether a current intensity $I_B$ can be defined for the same operating point in map 16. If these two conditions are confirmed, in a step 33, in the new completed map, a setpoint current intensity value $I_{Aext}$ is defined by extrapolation according to the equation (2), using the values mapped in map $Map_{Vk}$ and map 16. In a step 34, the value $I_{Aext}$ thus calculated is saved as being a new default value $IS_A(i)$ of setpoint current intensity associated with the rotation speed with index i.

If the result of the test 24 is negative, in a step 25 the counter k is incremented, in a step 26 it is checked that it has remained below the maximum counter q identified in step 22, and in step 24 it is examined anew whether the next map $Map_{Vk}$, a little farther from map 15, can be used to define a current intensity value $I_{Vk}$ for the operating point (N(i)C(j)).

Once again a check is made in this step 24 that the operating point (N(i), C(j)) can be used to read a current intensity value $I_B$ in map 16.

If the counter k reaches the value q without a setpoint current intensity value being able to be found in one of the intermediate maps—or if the operating point (N(i), C(j)) is in a forbidden zone of map 16, then, in a step 27, a setpoint current intensity value $I_{Aext}$ equal to the last calculated value $IS_A(i)$ is arbitrarily assigned to the 'completed' map.

Once either in step 27, or in step 33, a value $I_{Aex}$ has been assigned to the operating point (N(i), C(j)), in a step 28 the counter j is incremented and the process moves on to a next value of motor torque. If this is still inside the domain of operating points studied (test 29), the process is repeated from step 21.

Once the entire range of motor operating torques has been scanned, the process can move on to step 30 with another value of motor rotation speed.

Of course, other operating variants are conceivable where, in the range 11 of operating points illustrated in FIG. 2, arbitrary values of setpoint current intensity are assigned from other points of the boundary delimiting range 11. For example, the same setpoint current intensity value could be assigned to the points of range 11 corresponding to the same motor torque value (C(j)).

Figure 4:
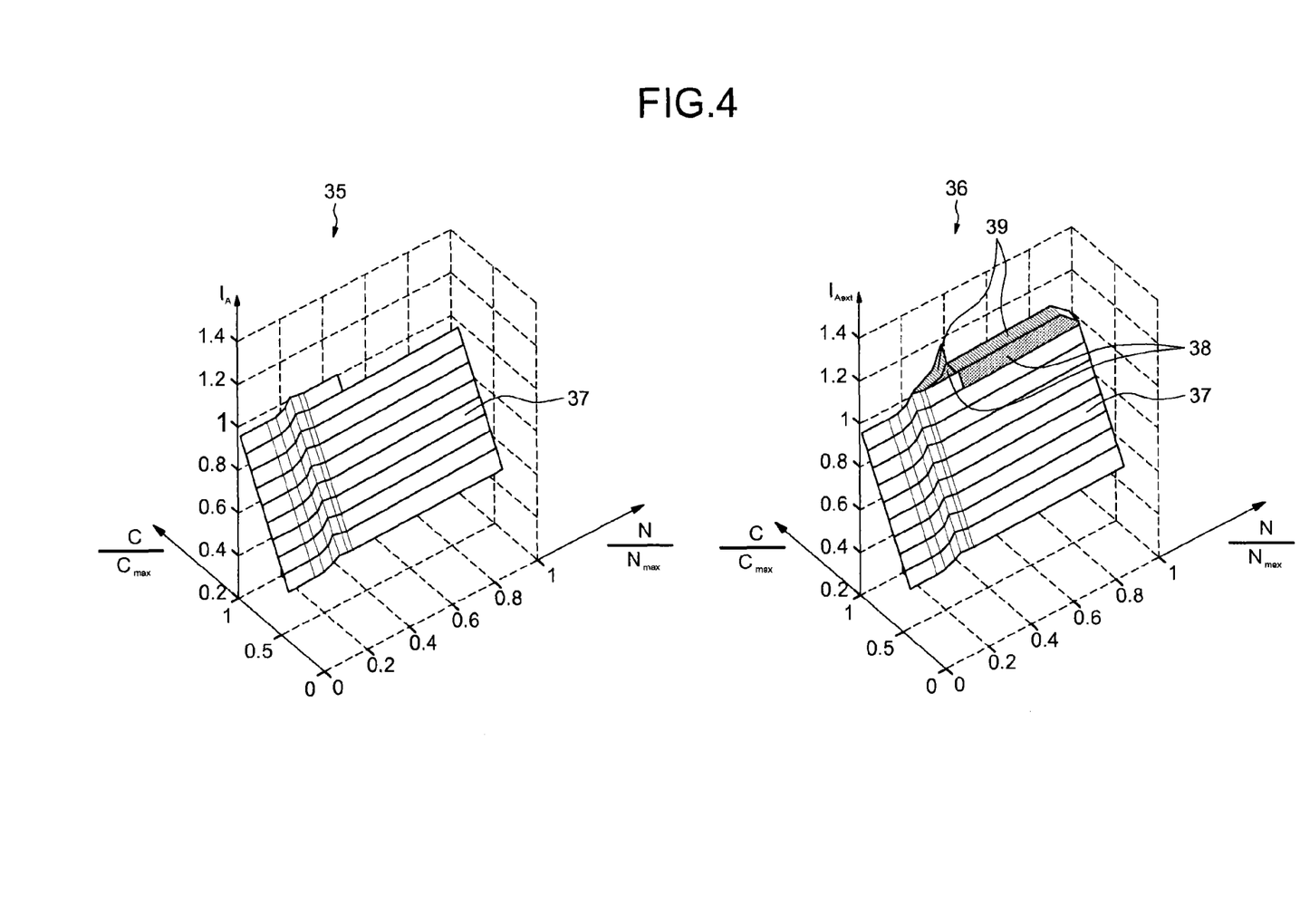
FIG. 4 illustrates a similar map to that of FIG. 2, in relief.

FIG. 4 visually illustrates a portion of map that could be map 15, the vertical axis corresponding this time not to the various voltages taken into account in the maps but to the value I of mapped setpoint current, I capable of being one of the values If, Id, Iq.

The horizontal axes correspond respectively to normalized values $N/N_{max}$ and $C/C_{max}$ which respectively represent a normalized motor rotation speed and a normalized motor torque $C/C_{max}$.

In FIG. 4 there is a first map 35 corresponding to a map derived, for example, from a simulation calculation. Map 35 has not been completed in the forbidden zones from the point of view of motor operation. Map 36 corresponds to a map completed according to the process described in FIGS. 2 and 3, from map 35 and from the neighboring available maps derived from the same simulation calculation. Maps 35 and 36 comprise common ranges 37, represented in white, which correspond to the ranges accessible by the motor at the breakpoint of the map considered. Map 36 further comprises zones 38, which are located beyond the permitted boundaries in terms of high torque and high rotation speed of the motor. These map portions 38 are located in continuity with the portions 37, and are represented by very fine hatching. Finally, for the highest torque values, and also for some rotation speed values approaching a value of 1, map 36 has portions 39 similar to range 11 in FIG. 2. On this domain 39 of engine operating points, the setpoint current values $I_{Aext}$ are duplicated from the values defined on the boundary between ranges 38 and 39. Range 39 is represented by oblique hatching and corresponds in a way to a portion of surface extruded horizontally from the upper boundary of the regions 38.

The invention is not limited to the examples of embodiment described and may have many variants. It is conceivable to use it for maps of setpoint values other than current intensity setpoints, these maps being embedded on board the vehicle, having forbidden zones of operation and used for determining setpoint values based on three coordinates. Thanks to the motor control system according to the invention, higher motor torques may be obtained when the battery voltage drops only if the motor is controlled by performing interpolations from maps displaying only permitted ranges of values and forbidden ranges with undefined values.

The invention claimed is:

1. An electric machine associated with an electronic control unit comprising:
   a group of embedded maps with a same setpoint parameter according to a first operating parameter and a second operating parameter of the electric machine, each of the maps being recorded in a same variation domain of the first and second operating parameters, each of the maps being associated with a different level of a third operating parameter of the electric machine, the maps including ranges of values having at least two different types of status, or permitted value ranges, and at least one range of extrapolated values, for at least one of the maps,
   wherein the electronic control unit is configured, when a value of a third operating parameter is associated with one of the embedded maps, for using as a setpoint value values belonging to the permitted value ranges excluding values belonging to the at least one range of extrapolated values,
   wherein the electronic control unit is configured, for values of the third operating parameter not associated with one of the embedded maps, for using interpolated values between two permitted values, or between a permitted value and an extrapolated value,
   wherein the same setpoint parameter is a current intensity value, and the same variation domain is represented between two torque values and between two values of rotation speed of the electric machine.

2. The method as claimed in claim 1, wherein the first operating parameter and the second operating parameter are proportional to rotation speed and torque of the electric machine, and the third operating parameter is proportional to a battery voltage, the mapped setpoint parameter being used for calculating a current intensity setpoint of the stator or rotor of the electric machine.

3. The method as claimed in claim 2, wherein, when using the specific subgroup of mapped values for an interpolation, the interpolation is performed between an upper voltage value of an unmodified portion of map, and a lower voltage value of a modified portion of map.

4. The method as claimed in claim 3, wherein use of a value belonging to the specific subgroup of mapped values for an interpolation is permitted only if the voltage for which it is desired to determine a setpoint value is greater than or equal to a threshold voltage.

5. The method as claimed in claim 1, used for calculating a rotor current intensity setpoint, a direct current intensity setpoint, and/or a quadrature current intensity setpoint in a synchronous electric machine.

6. A method of controlling an electric machine, with aid of a group of maps with a same setpoint parameter according to a first operating parameter and a second operating parameter defining an operating point of the electric machine,
   each of the maps being recorded in a same variation domain of the first and second operating parameters, each of the maps being associated with a different level of a third operating parameter of the electric machine, in which use is forbidden of a specific subgroup of values mapped as setpoint values, but this specific subgroup is used for calculating setpoint values interpolated between a point of the specific subgroup and a second value of a neighboring map not belonging to one of the specific subgroups,
   wherein the same setpoint parameter is a current value, and the same variation domain is represented between two torque values and between two values of rotation speed of the electric machine.

7. The method of control as claimed in claim 6, wherein the embedded maps are defined by selecting a limited number of reference maps from among a broader set of available maps, of which some portions are completed or modified, so that by subsequently performing interpolations between a modified portion of a first embedded map and an unmodified portion of a second embedded map, at least one portion of one of the non-embedded available maps is retrieved.

8. The method as claimed in claim 7, wherein at least one reference map is completed for obtaining a more complete embedded map, by extrapolating for each point to be completed, from values of another reference map and another non-embedded map which are respectively a closest reference map and non-embedded map, according to the third operating parameter, of the map to be completed, so that, the operating point to be completed is included in a permitted value range of the non-embedded map.

9. The method as claimed in claim 8, wherein, in a domain of operating points which are not mapped in any of the available maps included between the embedded map to be completed and the closest embedded map, one or more virtual setpoint values equal to one or more setpoint values of the same map, corresponding to boundary points of the same variation domain, are assigned to the operating points of the same variation domain.

10. The method as claimed in claim 9, wherein at least one zone of one of the embedded maps is completed by drawing a series of level lines of constant values from the boundary points of the at least one zone, the level lines being parallel to an axis corresponding to the first operating parameter or to an axis corresponding to the second operating parameter.

* * * * *